United States Patent
An et al.

(10) Patent No.: US 7,540,954 B2
(45) Date of Patent: Jun. 2, 2009

(54) POLLUTANT PURIFICATION APPARATUS

(75) Inventors: Yeong-Chan An, Seoul (KR); Jae-Hong Jeong, Suwon-si (KR)

(73) Assignee: Chasedai Environment Co., Ltd., Seoul (KR)

( * ) Notice: Subject to any disclaimer, the term of this patent is extended or adjusted under 35 U.S.C. 154(b) by 0 days.

(21) Appl. No.: 11/834,830

(22) Filed: Aug. 7, 2007

(65) Prior Publication Data
US 2008/0296213 A1    Dec. 4, 2008

(30) Foreign Application Priority Data
May 30, 2007 (KR) .................. 10-2007-0052786

(51) Int. Cl.
*E03F 5/14* (2006.01)
(52) U.S. Cl. .................. 210/170.03; 210/254; 210/305; 210/532.1; 210/538; 405/50
(58) Field of Classification Search ............ 210/170.03, 210/170.08, 254, 299, 305, 532.1, 532.2, 210/538; 405/36, 43, 50
See application file for complete search history.

(56) References Cited

U.S. PATENT DOCUMENTS

| | | | | |
|---|---|---|---|---|
| 1,793,599 A | * | 2/1931 | Egan ..................... | 210/170.03 |
| 2,711,223 A | * | 6/1955 | Temple ................... | 210/170.03 |
| 3,701,428 A | * | 10/1972 | Lesh ...................... | 210/170.08 |
| 4,935,132 A | * | 6/1990 | Schaier ........................ | 210/163 |
| 5,433,845 A | * | 7/1995 | Greene et al. .......... | 210/170.03 |
| 5,895,569 A | * | 4/1999 | Connelly ............... | 210/170.08 |
| 6,315,897 B1 | * | 11/2001 | Maxwell ................ | 210/170.03 |
| 6,749,746 B2 | * | 6/2004 | Mokrzycki ............... | 210/532.1 |
| 6,991,734 B1 | * | 1/2006 | Smith et al. ................... | 405/50 |
| 7,022,243 B2 | * | 4/2006 | Bryant .................. | 210/170.03 |
| 7,182,856 B2 | * | 2/2007 | Pank ..................... | 210/170.03 |
| 2007/0012608 A1 | * | 1/2007 | Su et al. ................. | 210/170.03 |

* cited by examiner

*Primary Examiner*—Christopher Upton
(74) *Attorney, Agent, or Firm*—Maeng-Ho Shin

(57) ABSTRACT

An apparatus for purifying polluted water is disclosed, which can naturally remove polluted water stagnated in a treatment tank. The apparatus includes a treatment tank and an infiltration tank. The treatment tank has an inlet at its one side, and first and second outlets at its other side. The treatment tank treats the polluted water that flows through the inlet and discharges the treated polluted water through the first outlet. The infiltration tank is connected to the second outlet and has a plurality of infiltration holes formed on the body thereof. The infiltration tank allows the treated polluted water that flows from the second outlet of the treatment tank to permeate into the ground though the plurality of infiltration holes. Since the polluted water stagnated in the treatment tank can be naturally released, odor due to decay of the polluted water and a subsequent insect infestation can be prevented. In addition, maintenance fees to maintain to the treatment tank can be reduced.

8 Claims, 4 Drawing Sheets

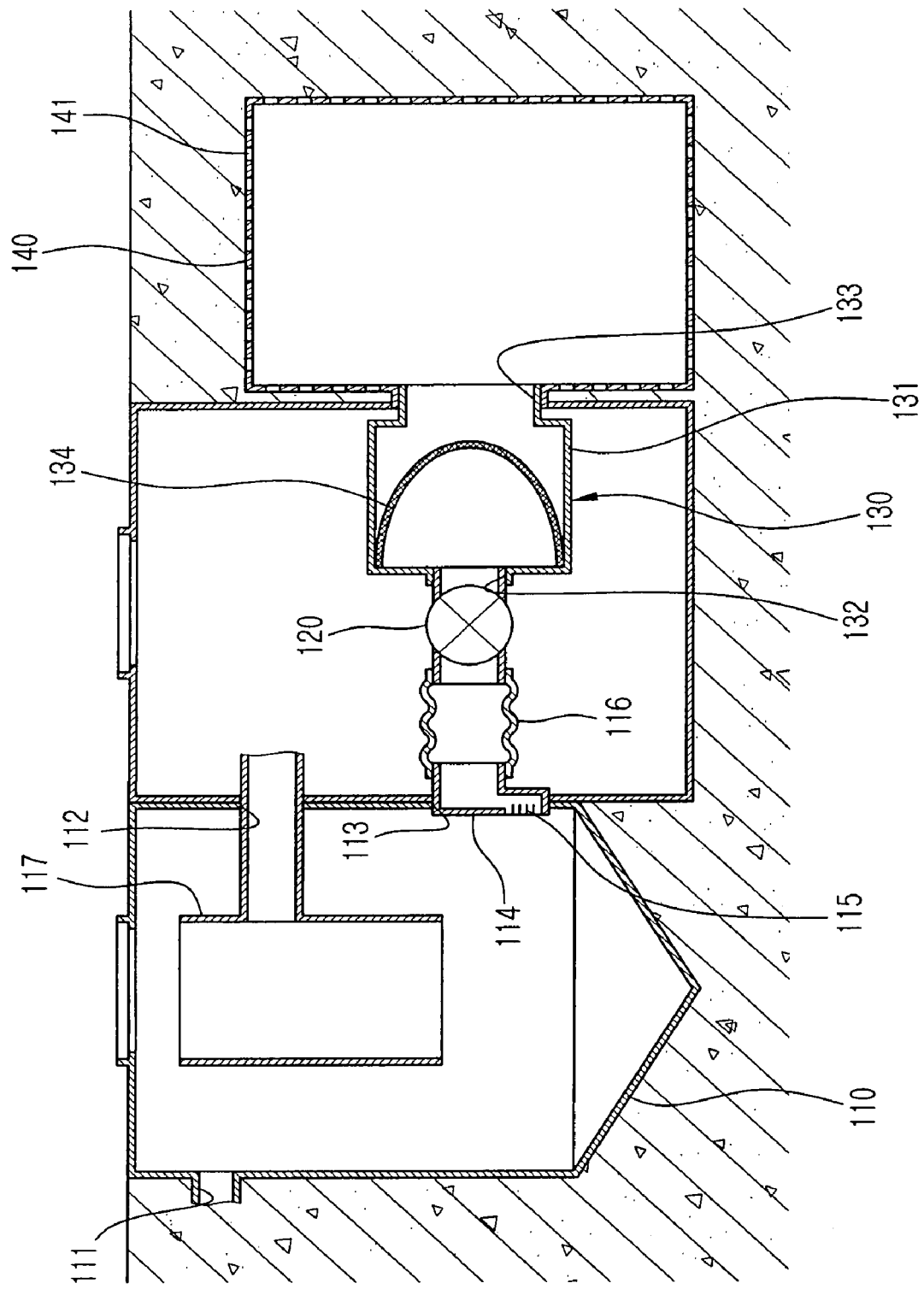
[FIG 1]

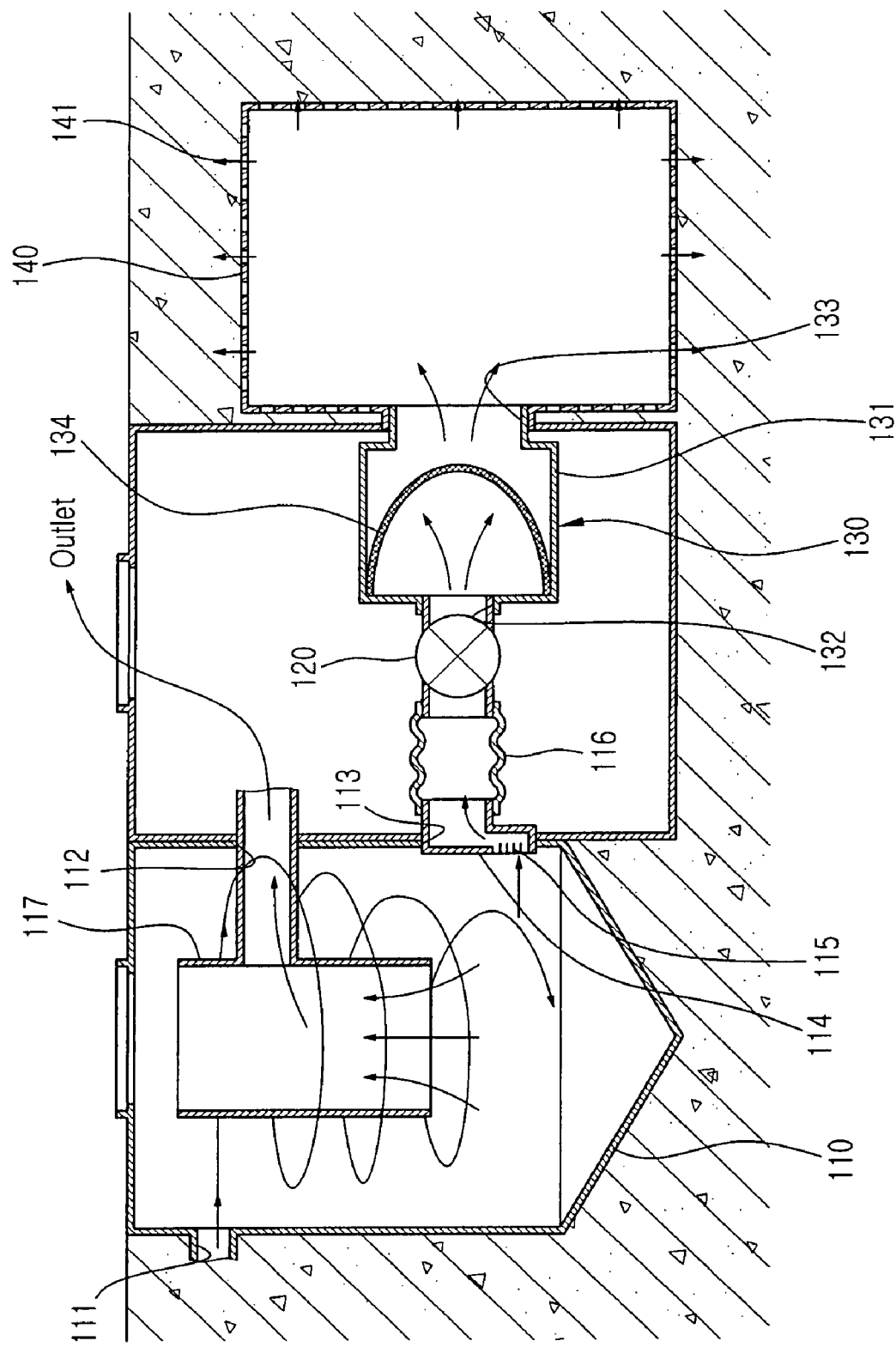
[FIG 2A]

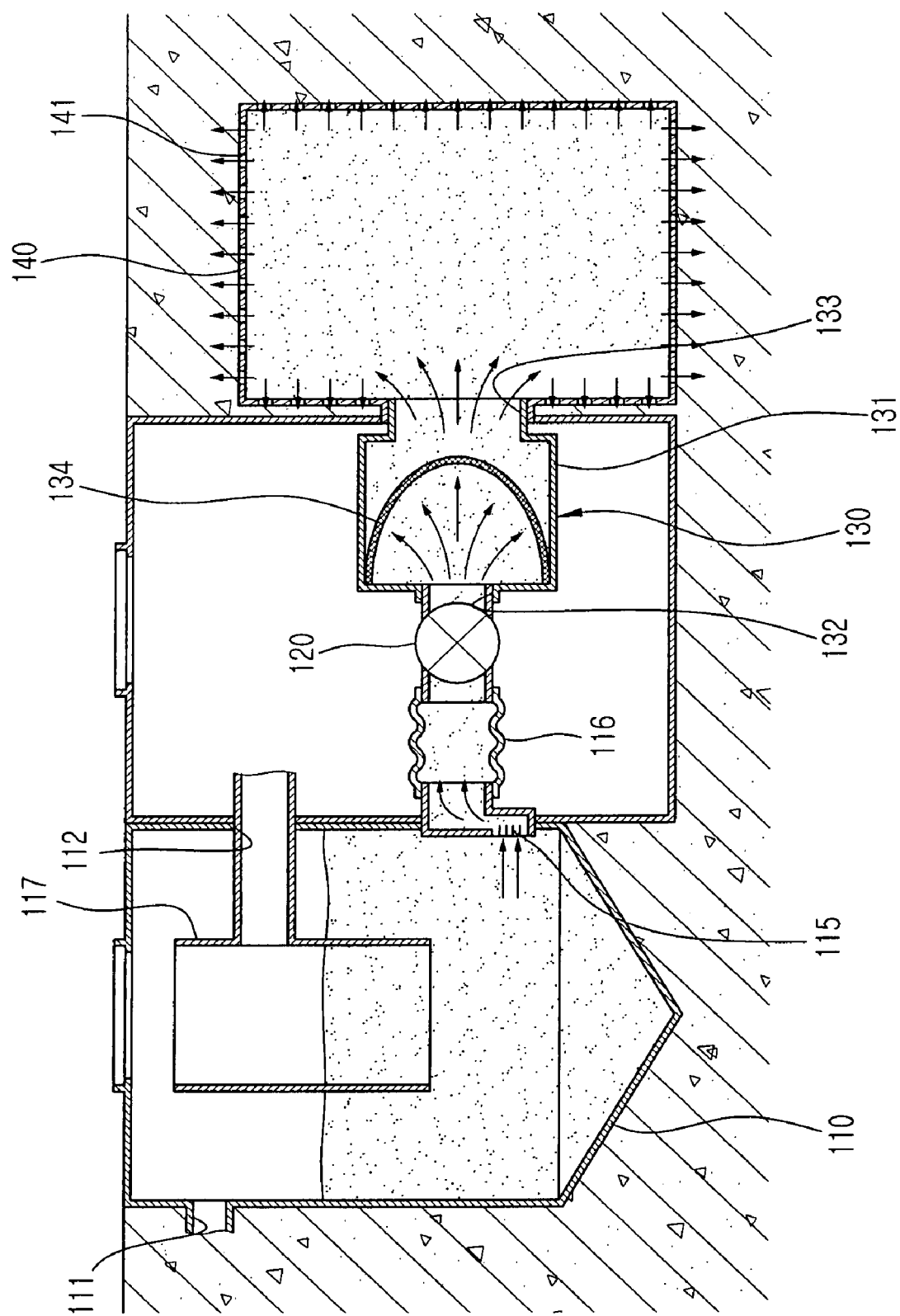
[FIG 2B]

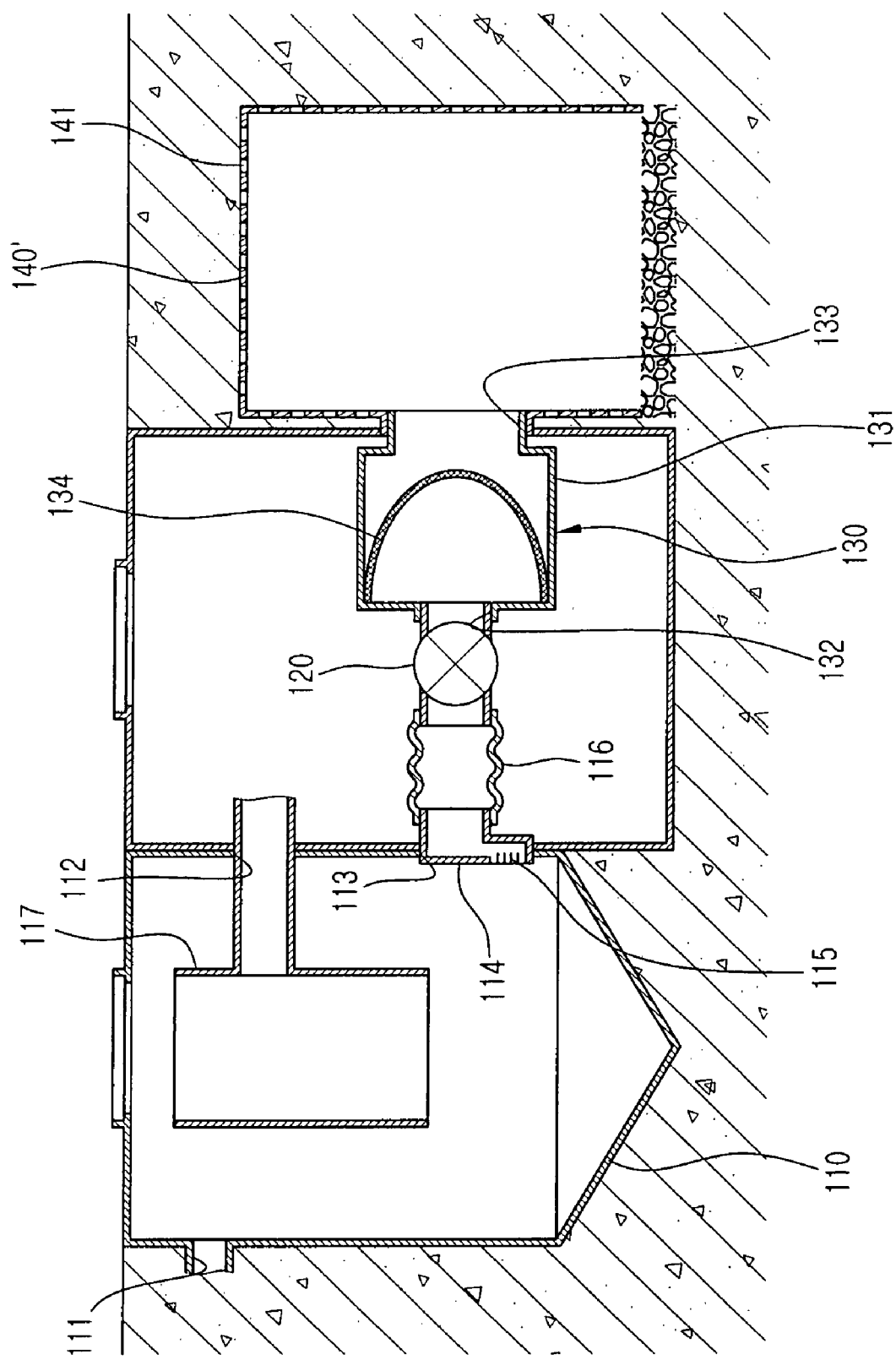
[FIG 3]

POLLUTANT PURIFICATION APPARATUS

PRIORITY

This application claims the benefit under 35 U.S.C. § 119 (a) of a Korean patent application filed on May 30, 2007 in the Korean Intellectual Property Office and assigned Serial No. 10-2007-0052786, and the entire disclosure of which is hereby incorporated by reference.

BACKGROUND OF THE INVENTION

1. Field of the Invention

The present invention relates to technology of treatment of polluted water. More particularly, this invention relates to an apparatus for purifying polluted water that can remove polluted water that has not yet been discharged from a treatment tank.

2. Description of the Related Art

In general, polluted materials are classified into point source pollutants and non-point source pollutants according to their pollution source (point pollution source and non-point pollution source). The non-point pollution source refers to a source that generates pollutants without any particular discharging paths, such as dusts from vehicle exhaust and tires, etc., which collect on roads, bridges, or parking lots, or in harmful dregs that build up on golf course grounds, farmland, and on construction sites, etc. When such pollutants are washed into rivers along with rainwater, water pollution occurs. Since these non-point source pollutants are washed into the rivers by rainwater, they are mixed with a variety of polluted materials that have various physical and chemical properties. To effectively purify such polluted water, the variety of polluted materials mixed and included in the polluted water must be sorted in stages, using their respective physical and chemical properties. In each stage, a polluted-water purification device is installed to comply with the types of polluted materials intended to be sorted.

For example, a hydraulic separation device serves to precipitate, float, sort, and separate suspended solid, and nutrient, and oil, etc., using a specific gravity difference and a density difference.

This hydraulic separation device is configured in such a way to receive polluted water through an inlet, separate and filter the polluted water in a treatment tank, and discharge the treated water through an outlet. The outlet is formed at a certain height from the bottom of the treatment tank such that the polluted water can be treated and then discharged from the treatment tank. That is, the treatment tank cannot discharge the polluted water under the point at which the outlet is installed. Therefore, the polluted water under the outlet becomes stagnant in the treatment tank and then decays, causing odor. Such an environment is conducive to insect infestation.

In a conventional art, a pump car must be employed to remove settled polluted materials in the treatment tank. Since the pump car pumps out stagnant polluted water as well as polluted materials, it can only remove a relatively small amount of polluted material from the treatment tank. That is, the conventional pump car has a limitation in that it can only effectively pump the polluted materials once, which causes high maintenance fees to maintain the treatment tank.

SUMMARY OF THE INVENTION

Therefore, the present invention has been made in view of the above problems, and it is an object of the present invention to provide an apparatus for purifying polluted water that can naturally remove polluted water that has become stagnant in a treatment tank.

In accordance with the present invention, the above and other objects can be accomplished by the provision of an apparatus for purifying polluted water that includes a treatment tank whose one side has an inlet receiving polluted water and whose other side has first and second outlets that discharge the polluted water, the treatment tank for treating the polluted water that flows through the inlet and discharging the treated polluted water through the first outlet, and an infiltration tank connected to the second outlet, having a plurality of infiltration holes formed on the body thereof for allowing the treated polluted water that flows thereinto to permeate into the ground.

Preferably, the second outlet is located lower than the first outlet.

Preferably, the apparatus further includes a baffle installed to the second outlet, for preventing floating materials floating on the polluted water from discharging while the polluted water is discharged through the second outlet.

Preferably, the apparatus further includes a screen installed to the second outlet, for filtering particle-shaped polluted materials while the polluted water is discharged through the second outlet.

Preferably, the apparatus further includes a pre-treatment device installed between the treatment tank and the infiltration tank, for filtering polluted materials in the polluted water discharged through the second outlet and discharging the filtered polluted water to the infiltration tank.

Preferably, the pre-treatment device includes a receiving case whose one side has an inlet receiving the polluted water discharged from the second outlet and whose other side has an outlet discharging the filtered polluted water to the infiltration tank, and a filtering structure installed in the receiving case, for filtering particle-shaped polluted materials in the polluted water that flows through the inlet.

Preferably, the pre-treatment tank is connected to the second outlet via a pipe. Here the pipe includes a flexible pipe a portion of which bends with respect to a change in external environment.

Preferably, the apparatus further includes a valve for controlling the discharge of the polluted water from the treatment tank to the pre-treatment device.

Preferably, the pre-treatment tank is detachably connected to both the treatment tank and the infiltration tank.

BRIEF DESCRIPTION OF THE DRAWINGS

The above and other objects, features, and other advantages of certain exemplary embodiments of the present invention will be more clearly understood from the following detailed description taken in conjunction with the accompanying drawings, in which:

FIG. 1 is a cross-sectional view depicting an apparatus for purifying polluted water according to an exemplary embodiment of the present invention;

FIG. 2A and FIG. 2B are views describing operations of the apparatus for purifying polluted water of FIG. 1; and FIG. 3 is a cross-sectional view depicting an apparatus for purifying polluted water according to an exemplary embodiment of the present invention.

Throughout the drawings, like reference numerals will be understood to refer to like parts, components and structures.

BRIEF DESCRIPTION OF SYMBOLS IN THE DRAWINGS

110: treatment tank
111: inlet
112: first outlet
113: second outlet
114: baffle
115: screen
116: flexible pipe
117: guide pipe
120: valve
130: pre-treatment device
131: receiving case
132: inlet
133: outlet
134: filter structure
140: infiltration tank
141: infiltration hole

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

FIG. 1 is a cross-sectional view depicting an apparatus for purifying polluted water according to an exemplary embodiment of the present invention, which is configured to include a treatment tank 110, a valve 120, a pre-treatment device 130, and an infiltration tank 140.

The treatment tank 110 is implemented with a hydro-cyclone separator that separates polluted material from polluted water using a centrifugal force generated by the spiral flow of fluid. As shown in FIG. 1, the treatment tank 110 is configured in such a way that an inlet 111 receiving polluted water is formed at one side (left of the treatment tank 110 with respect to FIG. 1) and a first outlet 112 (right of the treatment tank 110 with respect to FIG. 1) through which the polluted water passing through a guide pipe 117 is discharged, a second outlet 113 is formed at a certain height from the bottom of the treatment tank 110, which is lower than the height of the first outlet 112, to discharge polluted water that has not been discharged through the first outlet 112.

The second outlet 113 is configured to include a baffle 114 therein, whose lower portion is opened, and a screen 115 formed at the lower portion of baffle 114. The baffle 114 serves to prevent floating material in the polluted water, such as oil, and polystyrene foam, etc., at the higher level of the baffle 114 from being discharged to the second outlet 113. The screen 115 serves to prevent polluted materials, shaped as particles whose sizes are greater than a predetermined size, from being discharged to the infiltration tank 140 while the polluted water is discharged to the second outlet 113.

It is preferable that the baffle 114 is prepared within the second outlet 113 in such a way to be lower than the location of a pipe connected to the outside of the second outlet 113. From such a design, the baffle 114 can prevent the floating materials in the polluted water from discharging to the second outlet 113. The screen 115 can be implemented by any structure, such as a plate of through-holes or a mesh, provided that it can filter particle-shaped polluted materials.

Although the exemplary embodiment of the present invention is implemented in such a way that the baffle 114 and screen 115 are integrally formed at the second outlet 113, it can be modified such that the baffle 114 and screen 115 can be separately formed and installed.

Even though the treatment tank 110 of FIG. 1 employs the hydro-cyclone separator, it should be understood that the treatment tank 110 can be implemented by any tank for purifying polluted water, provided that it removes polluted materials from influx polluted water and then discharges treated water, such as an influx separator, etc., filed by the current applicant, and issued to Korean Patent No. 10-0464640.

The pre-treatment device 130 is shaped as a receiving case 131 within which a filtering structure 134 is installed. The receiving case 131 is configured in such a way that an inlet 132 is formed at the one side thereof to receive the polluted water discharged from the second outlet 113, and an outlet 133 is formed at the other side thereof to output the polluted water received through the inlet 132. The filtering structure 134 filters polluted materials while the polluted water passes through the receiving case 131. The filtering structure 134 is implemented by a mesh. It is preferable that the filtering structure 134 is shaped as a half-ellipse, in cross-sectional view of FIG. 1, to increase the effective filtering area.

Although the filtering structure 134 is arrayed in such a way that both its ends are fitted vertically to the receiving case 131 toward the inlet 132, it can be modified such that both its ends can be fitted horizontally to the receiving case 131.

The pre-treatment device 130 is installed in a hollow space under the ground between the treatment tank 110 and the infiltration tank 140. It is preferable that the pre-treatment device 130 is detachably installed between the treatment tank 110 and the infiltration tank 140 such that it can be separated from the installation place to clean away particle-shaped polluted materials collected by the filtering structure 134 from the receiving case 131, or such that it can be replaced.

Although the exemplary embodiment of the present invention is implemented to include the pre-treatment device 130, it may be modified such that the pre-treatment device 130 can be omitted. However, when the pre-treatment device 130 is employed in the apparatus for purifying polluted water as is shown in the exemplary embodiment of the present invention, the life span of the infiltration tank 140 can be extended.

The infiltration tank 140 is formed to include a plurality of infiltration holes 141 that allow the treated water of the pre-treatment device 130 to permeate into the ground. Each infiltration hole 141 has a size such that the treated water can permeate slowly into the ground. Therefore, when a lot of rainwater collects in the treatment tank 110, most of the treated water of the treatment tank 110 is discharged through the first outlet 112.

The treatment tank 110 is connected to the pre-treatment device 130 via a pipe at least a part of which is fabricated by a flexible pipe 116, such as a rubber hose, etc., such that a connection between the treatment tank 110 and the pre-treatment device 130 can be maintained without being damaged by external causes (for example, ground sinkage). Such a flexible pipe 116 may be used to connect the pre-treatment device 130 to the infiltration tank 140.

The valve 120 serves to control a channel between the treatment tank 110 and the pre-treatment device 130. The pre-treatment device 30 serves to filter particle-shaped polluted materials in the polluted water discharged through the second outlet 113 of the treatment tank 110. As the polluted water continues to be discharged through the second outlet 113, the particle-shaped polluted materials collect in the pre-treatment device 130. When the particle-shaped polluted materials continue to collect, the polluted water cannot be discharged to the infiltration tank 140 through the pre-treatment device 130. To resolve this situation, the valve 120 is closed to prevent the flow of the polluted water from the treatment tank 110 to the pre-treatment device 130, and then the pre-treatment device 130 is replaced or cleaned.

It should be understood that the exemplary embodiment of the present invention can be modified in such a way not to include the valve 120. But, if the valve 120 is included the apparatus as shown in the embodiment, it can adjust the load of the pre-treatment device 130 and thus extend the life span of the pre-treatment device 130. Also, although the exemplary embodiment of the present invention is configured in such a way that the valve 120 is located in the vicinity of the inlet 132 of the pre-treatment device 130 as shown in FIG. 1, it can be modified such that the valve 120 is located close to the second outlet 113 of the treatment tank 110.

The following is a description of operations of an apparatus for purifying polluted materials referring to FIGS. 2A and 2B.

FIG. 2A is a view describing a state where polluted water treated in the treatment tank 110 is discharged through the first and second outlets 112 and 113. The polluted water that flows through the inlet 111 of the treatment tank 110 is spirally circulated and goes down in the treatment tank 110 due to its centrifugal force. The polluted materials are separated from the polluted water, starting with relatively high-weight materials, and collect in the bottom of the treatment tank 110. When the polluted water separating from the polluted materials is raised to the height of the first outlet 112, it starts to discharge through the outlet 112 via the guide pipe 117. Here, before being discharged through the first outlet 112, the polluted water under the height of the first outlet 112 is firstly discharged through the second outlet 113. The polluted water discharged through the second outlet 113 requires a lot of time to permeate into the ground through the infiltration holes 141 of the infiltration tank 140. Therefore, the level of polluted water in the treatment tank 110 increases due to the influx of polluted water separated from polluted materials. Then, most of the polluted water in the treatment tank 110 is discharged through the first outlet 112. The guide pipe 117 prevents floating materials (oil, polystyrene foam, etc.) from directly discharging through the first outlet 112 along with the polluted water. Therefore, the floating materials can be removed from the treatment tank 110 through a manhole prepared on the upper portion of the treatment tank 110, using a net, etc.

FIG. 2B is a view describing a state where polluted water, treated and stagnated in the treatment tank 110 or not discharged through the first outlet 112, is discharged through the second outlet 113. The polluted water stagnated in the treatment tank 110 is discharged to the pre-treatment device 130 through the second outlet 113 lower than the first outlet 112 and then reaches the infiltration tank 140. The treated water in the infiltration tank 140 permeates into the ground through the infiltration holes 141. Therefore, the polluted water stagnated in the treatment tank 110 is slowly transferred to the infiltration tank 140 such that its level in the treatment tank 110 can be equal to at least that of the second outlet 113. The baffle 114 serves to prevent floating materials in the polluted water, such as oil, and polystyrene foam, etc., floating on a surface equal to or higher than the baffle 114, from being directly discharged through the second outlet 113 while the polluted water is discharged through the second outlet 113. This occurs such that the large particle-shaped polluted materials can be firstly filtered by the screen 115 prepared at the location lower than the baffle 114 and only the polluted water is discharged through the second outlet 113. The polluted water discharged through the second outlet 113 is filtered, again, by the filtering structure 134 of the pre-treatment device 130 to remove small particle-shaped polluted materials therefrom and then flows into the infiltration tank 140. The influx water in the infiltration tank 140 slowly permeates into the ground through the infiltration holes 141.

As such, since the polluted water stagnated in the treatment tank 110 can slowly permeate into the ground through the infiltration holes 141 of the infiltration tank 140, the amount of polluted water is naturally and evidently reduced.

FIG. 3 is a cross-sectional view depicting an apparatus for purifying polluted water according to an exemplary embodiment of the present invention.

The embodiment of FIG. 3 is similar to that of FIG. 1 except for an infiltration tank 140' whose bottom side is opened. Since the structures between the exemplary embodiments of FIG. 3 and FIG. 1 are similar to each other, the detailed description of the exemplary embodiment of FIG. 3 is omitted.

Also, as shown in FIGS. 1 and 3, the infiltration tank 140 according to an exemplary embodiment of the present invention can be implemented by a structure, provided that it can allow the treated water to permeate into the ground.

Although the exemplary embodiments of the present application do not describe external configurations of the infiltration tank 140, it can be constructed in such a way that a filter blank, such as non-woven fabric, covers the outside of the infiltration tank 140, broken stones are arrayed around the filter blank, and another filter blank covers around the broken stones.

As described above, the apparatus for purifying polluted water according to an exemplary embodiment of the present invention has advantages as follows.

Firstly, the polluted water stagnated in the treatment tank can be naturally released through the infiltration holes of the infiltration tank.

Secondly, since the treatment tank does not cause the polluted water to become stagnant, it can prevent odors from generating and prevent an insect infestation.

Thirdly, since only the polluted materials separated from the polluted water are removed, the pump car can remove the polluted materials from the treatment tank with relatively high efficiency, thereby reducing the number of operations of the pump car, and decreasing maintenance fees to maintain the treatment tank.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims and their equivalents.

What is claimed is:

1. An apparatus for purifying polluted water comprising:
    a treatment tank whose one side comprises an inlet for receiving polluted water and whose other side comprises a first outlet and a second outlet for discharging the polluted water, the treatment tank for treating the polluted water that flows through the inlet and discharging the treated polluted water through the first outlet via a guide pipe for preventing floating materials from discharging through the first outlet;

a pre-treatment device connected to the second outlet via a flexible pipe which bends with respect to a change in external environment, the pre-treatment device for filtering polluted materials in the polluted water discharged through the second outlet; and an infiltration tank connected to the pre-treatment device, comprising a plurality of infiltration holes formed on the body thereof for allowing the treated polluted water that flows thereinto from the pre-treatment device to permeate into the ground.

2. The apparatus according to claim 1, wherein the second outlet is located lower than the first outlet.

3. The apparatus according to claim 1, further comprising a baffle installed to the second outlet, for preventing floating materials floating on the polluted water from discharging while the polluted water is discharged through the second outlet.

4. The apparatus according to claim 1, further comprising a screen installed to the second outlet, for filtering particle-shaped polluted materials while the polluted water is discharged through the second outlet.

5. The apparatus according to claim 1, wherein the pre-treatment device is installed between the treatment tank and the infiltration tank and discharges the filtered polluted water to the infiltration tank.

6. The apparatus according to claim 5, wherein the pre-treatment device comprises:

a receiving case whose one side comprises an inlet receiving the polluted water discharged from the second outlet and whose other side comprises an outlet discharging the filtered polluted water to the infiltration tank; and a filtering structure installed in the receiving case, for filtering particle-shaped polluted materials in the polluted water that flows through the inlet.

7. The apparatus according to claim 5, further comprising a valve for controlling the discharge of the polluted water from the treatment tank to the pre-treatment device.

8. The apparatus according to claim 5, wherein the pre-treatment device is detachably connected to both the treatment tank and the infiltration tank.

* * * * *